United States Patent
Umeuchi et al.

(10) Patent No.: US 8,630,220 B2
(45) Date of Patent: Jan. 14, 2014

(54) ACCESS POINT SCAN METHOD, ACCESS POINT SCAN APPARATUS, AND STORAGE MEDIUM STORING ACCESS POINT SCAN PROGRAM

(75) Inventors: Makoto Umeuchi, Yokosuka (JP);
Tomohiro Tokuyasu, Yokosuka (JP);
Takefumi Hiraguri, Yokosuka (JP);
Toshihiro Manabe, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 794 days.

(21) Appl. No.: 12/864,426

(22) PCT Filed: Dec. 18, 2008

(86) PCT No.: PCT/JP2008/073103
§ 371 (c)(1),
(2), (4) Date: Jul. 23, 2010

(87) PCT Pub. No.: WO2009/104336
PCT Pub. Date: Aug. 27, 2009

(65) Prior Publication Data
US 2010/0303051 A1 Dec. 2, 2010

(30) Foreign Application Priority Data
Feb. 21, 2008 (JP) .................................. 2008-040322

(51) Int. Cl.
*H04W 88/08* (2009.01)
(52) U.S. Cl.
USPC ........................................................ 370/312
(58) Field of Classification Search
USPC .................................................. 370/338, 312
See application file for complete search history.

(56) References Cited

U.S. PATENT DOCUMENTS

| | | | |
|---|---|---|---|
| 7,796,988 B2* | 9/2010 | Cave et al. ..................... | 455/434 |
| 7,933,319 B2* | 4/2011 | Yen et al. ....................... | 375/220 |
| 2004/0063427 A1* | 4/2004 | Narasimha et al. ............ | 455/434 |
| 2007/0010280 A1* | 1/2007 | Zalio et al. ..................... | 455/525 |

FOREIGN PATENT DOCUMENTS

| | | |
|---|---|---|
| CN | 1666557 A | 9/2005 |
| JP | 2005-051661 A | 2/2005 |
| JP | 2007-166412 A | 6/2007 |
| JP | 2007-306510 A | 11/2007 |

OTHER PUBLICATIONS

IEEE 802.11 Std., Part 11: Wireless LAN MAC and PHY Specifications "11.1.3.1 Passive Scanning" & "11.1.3.2 Active Scanning", 2007, p. 422.

* cited by examiner

*Primary Examiner* — Sulaiman Nooristany
(74) *Attorney, Agent, or Firm* — Harness, Dickey & Pierce, P.L.C.

(57) ABSTRACT

A probe request for an access point scan is transmitted over a specified radio channel according to an order of scanning, a connection candidate AP list including information indicating an access point which transmits a probe response and a received signal strength indication is generated when the probe response is received, the connection candidate AP list is referred to, one access point is selected from access points whose corresponding received signal strength indications exceed a predetermined threshold, connection processing is performed on the one access point being selected on the specified radio channel, and scanning is repeatedly performed by specifying a radio channel which is second in the order until scanning on all radio channels for which the order of scanning is set is completed when no probe response is received or the connection candidate AP list includes no received signal strength indication which exceeds the threshold.

11 Claims, 8 Drawing Sheets

ACCESS POINT SCAN METHOD, ACCESS POINT SCAN APPARATUS, AND STORAGE MEDIUM STORING ACCESS POINT SCAN PROGRAM

CROSS-REFERENCE TO RELATED APPLICATION

This application is a U.S. National Stage application claiming the benefit of prior filed International Application Number PCT/JP2008/073103, filed on Dec. 18, 2008, in which the International Application claims priority from Japanese Patent Application Number 2008-040322, filed on Feb. 21, 2008, the entire contents of which are incorporated herein by reference.

TECHNICAL FIELD

The present invention relates to an access point scan method, an access point scan apparatus, and an access point scan program which make a station connectable to a plurality of access points of a wireless LAN system scan for an access point to which the station is to be connected and a radio channel, the access point being one of a plurality of access points having information required for connection registered therein in advance as candidates for connection.

BACKGROUND ART

In the past, in a wireless LAN system, two types of access point scan methods, passive scanning and active scanning, have been set as standard (Non-patent Document 1).

A station performing passive scanning described in "11.1.3.1 Passive scanning" of IEEE 802.11 Std. receives a beacon (a management frame) transmitted by an access point, and, based on a connection configuration included in the beacon, determines an access point to which the station is to be connected. That is, based on the connection configuration included in the received beacon, the station selects an access point whose service set identifier (SSID) coincides with the SSID of an access point registered as a candidate for connection in advance, and performs connection processing. When there are a plurality of available radio channels, the station sequentially performs scanning on the radio channels.

A station performing active scanning described in "11.1.3.2 Active scanning" of IEEE 802.11 Std. transmits a probe request for an access point scan for each of the available radio channels. The probe request is broadcasted, and, as the contents thereof, the SSID of an access point registered as a candidate for connection in advance or a broadcast SSID (SSID=0) is set. After transmitting the probe request, the station starts a timer and monitors a response, and, when the station receives no probe response within the monitoring time, the station scans for the next radio channel. On the other hand, the access point which receives the probe request transmits a probe response to a transmission source of the probe request as a response thereto when the SSID set in the probe request coincides with the SSID of the access point or is the broadcast SSID. The connection configuration included in the probe response is equal to that included in the beacon. Based on the connection configuration, the station selects an access point which coincides with the SSID of the access point registered as a candidate for connection in advance, and performs connection processing.

Non-patent Document 1: IEEE 802.11 Std. "11.1.3.1 Passive scanning", "11.1.3.2 Active scanning"

DISCLOSURE

Problems to be Solved

In the wireless LAN system, the two types of access point scan methods described above are set. However, these methods merely define an information gathering method of an access point, and do not define how to use the gathered connection configuration. As a result, even when there are a plurality of connectable access points and radio channels, an access point and a radio channel by which good communication quality can be obtained are not selected therefrom.

Incidentally, the shorter the time between scanning for an access point and establishment of radio connection, the better. The passive scanning has the advantage of low power consumption because it requires only receiving operation; however, the passive scanning has the disadvantage that the scanning time becomes longer because scanning at beacon intervals, even in the shortest time, is inevitable on each radio channel. On the other hand, it is true that the active scanning consumes higher amounts of power because it requires transmission and receiving operations; however, the active scanning has the advantage of shortening the scanning time because it allows a station to scan for an access point actively. However, to select an access point and a radio channel with optimum communication quality, it is necessary to gather connection configurations by performing active scanning on all the available radio channels and compare the connection configurations. This results in a longer scanning time with an increase in the number of available channels. Incidentally, there is a method by which connection is established as soon as a connectable access point and a radio channel are found; however, there is no assurance that a combination of the access point and the radio channel is the optimum combination.

A proposition of the present invention is to provide an access point scan method, an access point scan apparatus, and an access point scan program which can scan for an access point and a radio channel by using active scanning and efficiently select an access point and a radio channel by which good communication quality can be obtained.

Means for Solving the Problems

According to the first aspect of the present invention, an access point scan method by which a station connectable to a plurality of access points scans for an access point to which the station is to be connected and a radio channel by active scanning, the method includes a first step setting an order of scanning radio channels, a second step transmitting a probe request for an access point scan over a specified radio channel according to the order of scanning, a third step generating a connection candidate access point (AP) list when a probe response to the probe request is received, the connection candidate AP list including information indicating an access point which transmits the probe response and a received signal strength indication, a fourth step referring to the connection candidate AP list and selecting one access point from access points whose corresponding received signal strength indications exceed a predetermined threshold, a fifth step performing connection processing on one access point selected in the fourth step on the specified radio channel, and a sixth step specifying a radio channel which is second in the order and going back to the second step until scanning performed on all radio channels for which the order of scanning is set in the first step is completed when the probe response is not received in the third step or the connection candidate AP list includes no received signal strength indication which exceeds the threshold in the fourth step.

Moreover, before the fifth step, a seventh step transmitting a dummy packet to the access point selected in the fourth step over the specified radio channel, calculating a packet error rate from number of received acknowledgement frames relative to number of transmitted dummy packets, proceeding to the fifth step when the packet error rate is equal to or less than a predetermined threshold, and proceeding to the sixth step when the packet error rate exceeds the predetermined threshold may be provided.

In addition, before the fifth step, an eighth step measuring a busy ratio indicating a time ratio in which the specified radio channel being performed carrier sense for a predetermined time is busy, proceeding to the fifth step when the busy ratio is equal to or less than a predetermined threshold, and proceeding to the sixth step when the busy ratio exceeds the predetermined threshold may be provided.

Furthermore, before the fifth step, a ninth step performing scanning on a radio channel near the specified radio channel, proceeding to the fifth step when a received signal strength indication corresponding to an access point which transmits a response is equal to or less than a predetermined threshold, and proceeding to the sixth step when the received signal strength indication exceeds the predetermined threshold may be provided.

Moreover, a tenth step storing the specified radio channel and the connection candidate AP list when the connection candidate AP list includes no received signal strength indication which exceeds the threshold in the fourth step and entering the sixth step, and an eleventh step selecting an access point and a radio channel with a maximum received signal strength indication in received signal strength indications of the connection candidate AP list stored in the tenth step and performing processing for connection with the access point on the radio channel when scanning performed on all the radio channels is completed in the sixth step may be provided. In addition, after the eleventh step, a twelfth step performing processing for reducing the threshold of the received signal strength indication used in the next scanning in the fourth step in such a way that the threshold does not fall below a predetermined minimum threshold may be provided.

Moreover, in the above access point scan method, the first step may set predetermined prior channels as radio channels to be subjected to scanning in advance and set an order of scanning for the prior channels, and the sixth step may specify a radio channel to be subjected to scanning next according to the order of scanning the prior channels, and, when scanning performed on all prior channels is completed, specify a radio channel to be subjected to scanning next from non-prior channels.

In addition, radio channels to be used by a neighboring access point of an access point which is currently in connection may be acquired from the access point which is currently in connection, and the radio channels may be set as prior channels in the first step in the next scanning.

Furthermore, a history of access points and radio channels being connected in the past may be held, radio channels of an access point to which connection is made next to an access point which is currently in connection may be estimated based on the history, and the radio channels may be set as prior channels in the first step in the next scanning.

Moreover, a connection candidate AP list of APs not selected may be held when one access point to which connection is made is selected in the fourth step from the access points whose corresponding received signal strength indications exceed the predetermined threshold or no received signal strength indication which exceeds the predetermined threshold exists, and radio channels with higher received signal strength indications may be set from the connection candidate AP list being held as prior channels in the first step in the next scanning when a received signal strength indication corresponding to an access point to which connection is currently established is reduced.

According to the second aspect of the present invention, an access point scan apparatus which allows a station connectable to a plurality of access points to scan for an access point to which the station is to be connected and a radio channel by active scanning, the apparatus includes a channel decision section setting an order of scanning radio channels, a radio connection processing section performing scanning on a specified radio channel according to the order of scanning and generating a connection candidate access point (AP) list including information indicating an access point which responds to the scanning and a received signal strength indication, and an access point (AP) selection section referring to the connection candidate AP list, selecting one access point from access points whose corresponding received signal strength indications exceed a predetermined threshold, and instructing the radio connection processing section to perform connection processing on the one access point on the specified radio channel, and, instructing to perform scanning on a next specified radio channel when no response is made to the scanning or the connection candidate AP list includes no received signal strength indication which exceeds the threshold.

The AP selection section may store the radio channels and the connection candidate AP list when the connection candidate AP list includes no received signal strength indication which exceeds the threshold, and the AP selection section may select an access point and a radio channel with a maximum received signal strength indication in received signal strength indications of the connection candidate AP list and instruct the radio connection processing section to perform connection processing on the access point being selected on the radio channel being selected when scanning performed on all radio channels is completed. In addition, the AP selection section may perform processing for reducing the threshold of the received signal strength indication used in the next scanning in such a way that the threshold does not fall below a predetermined minimum threshold.

The channel decision section may set predetermined prior channels as radio channels to be subjected to scanning in advance, set an order of scanning for the prior channels, and, when scanning performed on all prior channels is completed, specify a radio channel to be subjected to scanning next from non-prior channels.

According to a third aspect of the present invention, an access point scan program which allows a station connectable to a plurality of access points to scan for an access point to which the station is to be connected and a radio channel by active scanning, the program includes a step setting an order of scanning radio channels, a step performing scanning on a specified radio channel according to the order of scanning and generating a connection candidate access point (AP) list including information indicating an access point which responds to the scanning and a received signal strength indication, and a step referring to the connection candidate AP list, selecting one access point from access points whose corresponding received signal strength indications exceed a predetermined threshold, and instructing connection processing to be performed on the one access point on the specified radio channel, and, instructing to perform scanning on a next specified radio channel when no response is made to the scanning or the connection candidate AP list includes no received signal strength indication which exceeds the threshold.

According to the present invention, the order of scanning is set for prescribed radio channels or limited prior channels, and, when an access point whose corresponding received signal strength indication exceeds a threshold is found on the radio channel subjected to scanning, connection processing is performed on the access point, and subsequent scanning can be terminated.

This makes it possible to make connection to a radio channel and an access point with which adequate communication quality can be obtained by a uniform received signal strength indication. Moreover, in the order of scanning with which connection is easily made, by terminating the scanning when an AP whose corresponding received signal strength indication exceeds a threshold is found, it is possible to shorten the connection time as compared to the existing method by which scanning is performed on all the radio channels randomly.

DETAILED DESCRIPTION OF THE EMBODIMENTS

Embodiment of an AP Scan Apparatus

Figure 1:
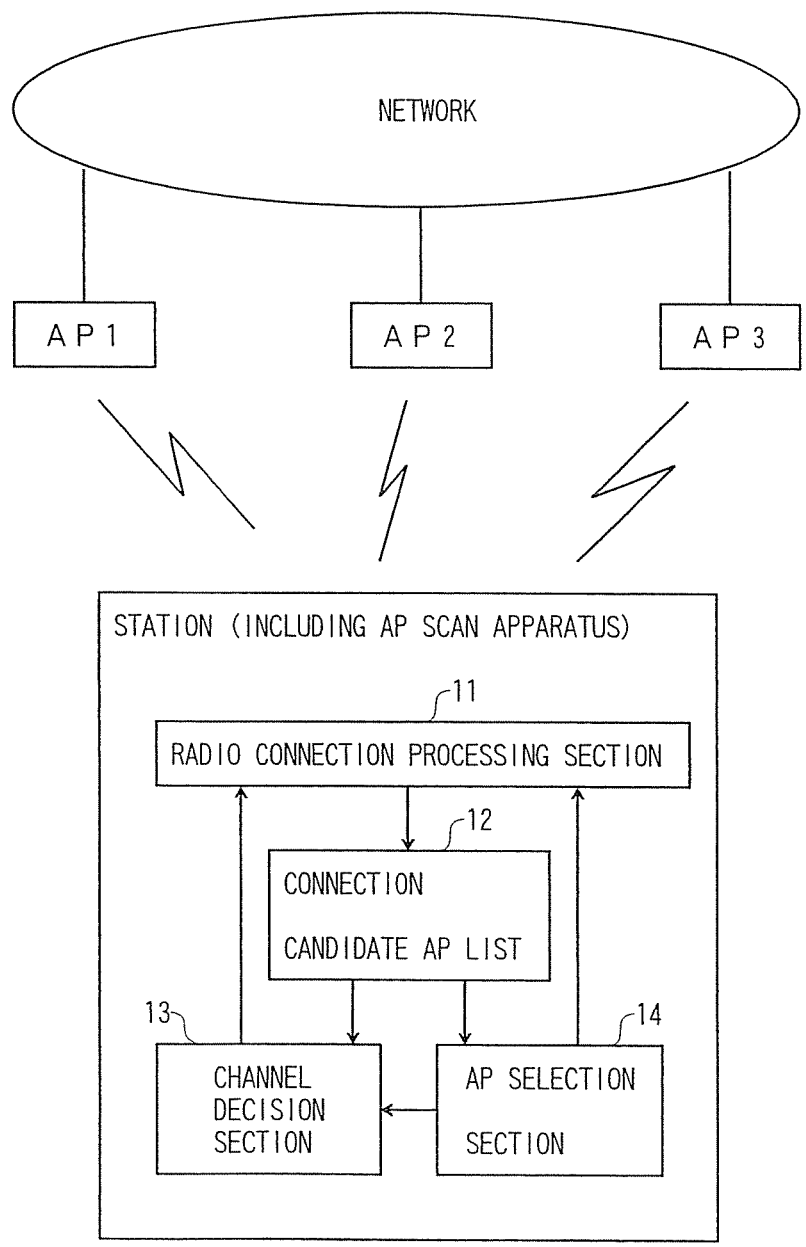
FIG. 1 is a diagram showing an embodiment of a station including an AP scan apparatus of the present invention.

FIG. 1 shows an embodiment of a station including an AP scan apparatus of the present invention. Here, an access point is abbreviated as an AP.

In the drawing, the station including the AP scan apparatus performs active scanning at the time of connection to an AP including the time of handoff, whereby the station is connected to a predetermined AP of AP1, AP2, and AP3 by a predetermined radio channel and is connected to a network via the AP to which the station is connected. In the station, what is related to the AP scan apparatus includes a radio connection processing section 11, a connection candidate AP list 12, a channel decision section 13, and an AP selection section 14.

According to a procedure described below, the channel decision section 13 specifies a radio channel to be subjected to active scanning, and notifies the radio connection processing section 11 of the radio channel. The radio connection processing section 11 transmits and receives a wireless packet in a wireless medium between the radio connection processing section 11 and the AP, performs active scanning on the radio channel specified by the channel decision section 13, and, when receiving a probe response to the transmitted probe request, outputs identification information (for example, a basic service set identifier (BSSID)) identifying the AP which has transmitted the probe response and a received signal strength indication to the connection candidate AP list 12. The connection candidate AP list 12 holds the identification information of the AP which has transmitted the probe response by the active scanning performed on the specified radio channel and the received signal strength indication from the radio connection processing section 11 as a list. The AP selection section 14 selects an AP from the connection candidate AP list 12, the AP meeting the conditions described below, and instructs the radio connection processing section 11 to perform connection processing on the AP. The radio connection processing section 11 performs the connection processing on the AP selected by the AP selection section 14 on the radio channel subjected to the active scanning. Other connection relations in the drawing will be described in the following embodiments.

First Embodiment of an AP Scan Method

Figure 2:
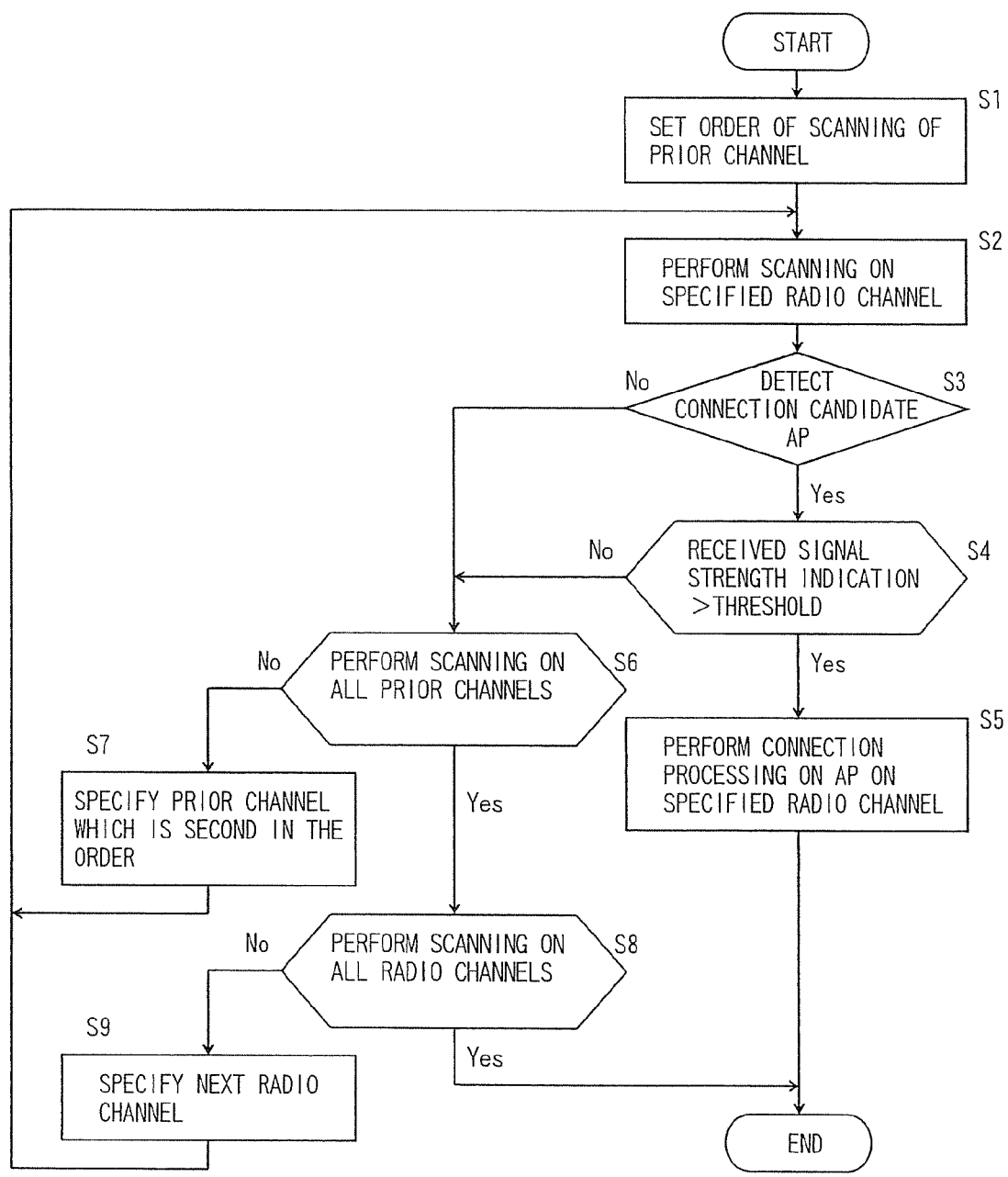
FIG. 2 is a flowchart showing a first embodiment of an AP scan method of the present invention.

FIG. 2 shows a first embodiment of an AP scan method of the present invention. Hereinafter, a description will be given with reference to an example of a configuration of the station shown in FIG. 1.

In the drawing, the channel decision section 13 sets predetermined prior channels from all the prescribed radio channels as radio channels to be subjected to scanning, and sets the order of scanning for the prior channels (S1). Incidentally, this processing is assumed to include a case in which the order of scanning is set for all the prescribed radio channels. The radio connection processing section 11 transmits a probe request for an AP scan over the specified radio channel according to the order of scanning set by the channel decision section 13 (S2), and then waits for a probe response to be transmitted from an AP which receives the probe request. Here, when receiving the probe response to the probe request transmitted over the specified radio channel, the radio connection processing section 11 generates the connection candidate AP list 12 from the information indicating the AP which has transmitted the probe response and the received signal strength indication (S3).

The AP selection section 14 refers to the connection candidate AP list 12, selects one AP from among the APs whose corresponding received signal strength indications exceed a predetermined threshold, the AP to which connection is established, and notifies the radio connection processing section 11 of the AP (S4). Here, the AP selection section 14 selects a single AP by using a BSSID which is the identification information specific to the AP. The radio connection processing section 11 performs connection processing, on the radio channel subjected to the scanning, on the one AP of which the radio connection processing section 11 is notified by the AP selection section 14 (S5).

When no probe response is received in the scanning performed on the specified radio channel in step S3 or the connection candidate AP list 12 includes no received signal strength indication which exceeds the threshold in step S4, a prior channel which is second in the order is specified (S6 and S7) and the procedure goes back to the scanning in step S2 until scanning on all the prior channels for which the order of scanning is set in step S1 is completed. Moreover, when an AP whose corresponding received signal strength indication exceeds the threshold is not found even when scanning performed on all the prior channels is completed, the same processing is performed on all the radio channels including a non-prior channel (S8 and S9).

As described above, in this embodiment, the order of scanning is set for prescribed radio channels or limited prior channels, and, when an AP whose corresponding received signal strength indication exceeds the threshold is found on the radio channel subjected to the scanning, connection processing is performed on the AP, and subsequent scanning is terminated. By setting the order of scanning, it becomes possible, for example, to perform scanning preferentially on a radio channel with a low usage frequency for the entire wireless system or perform scanning preferentially on a radio channel with a high usage frequency for the station. This makes it possible to shorten the connection time. In addition, since there is not so much of a difference in the communication quality when the received signal strength indication exceeds a certain received signal strength indication, as compared with when an AP whose corresponding received signal strength indication becomes maximum is selected by performing scanning on all the radio channels, it is possible to shorten the connection time by terminating the scanning when an AP whose corresponding received signal strength indication exceeds the threshold is found.

Incidentally, in the existing wireless LAN system, radio connection is made by specifying an SSID which is a network ID. However, in this method, there is a possibility that a plurality of APs having the same SSID exist. Thus, even when an AP to which connection should be made is identified by the active scanning, connection to the AP cannot always be made. In this embodiment, the existing problem is solved by specifying a BSSID which is the identification information specific to the AP in step S4 and performing connection processing in step S5 by using the BSSID as the AP to be subjected to the connection processing.

Second Embodiment of the AP Scan Method

Figure 3:
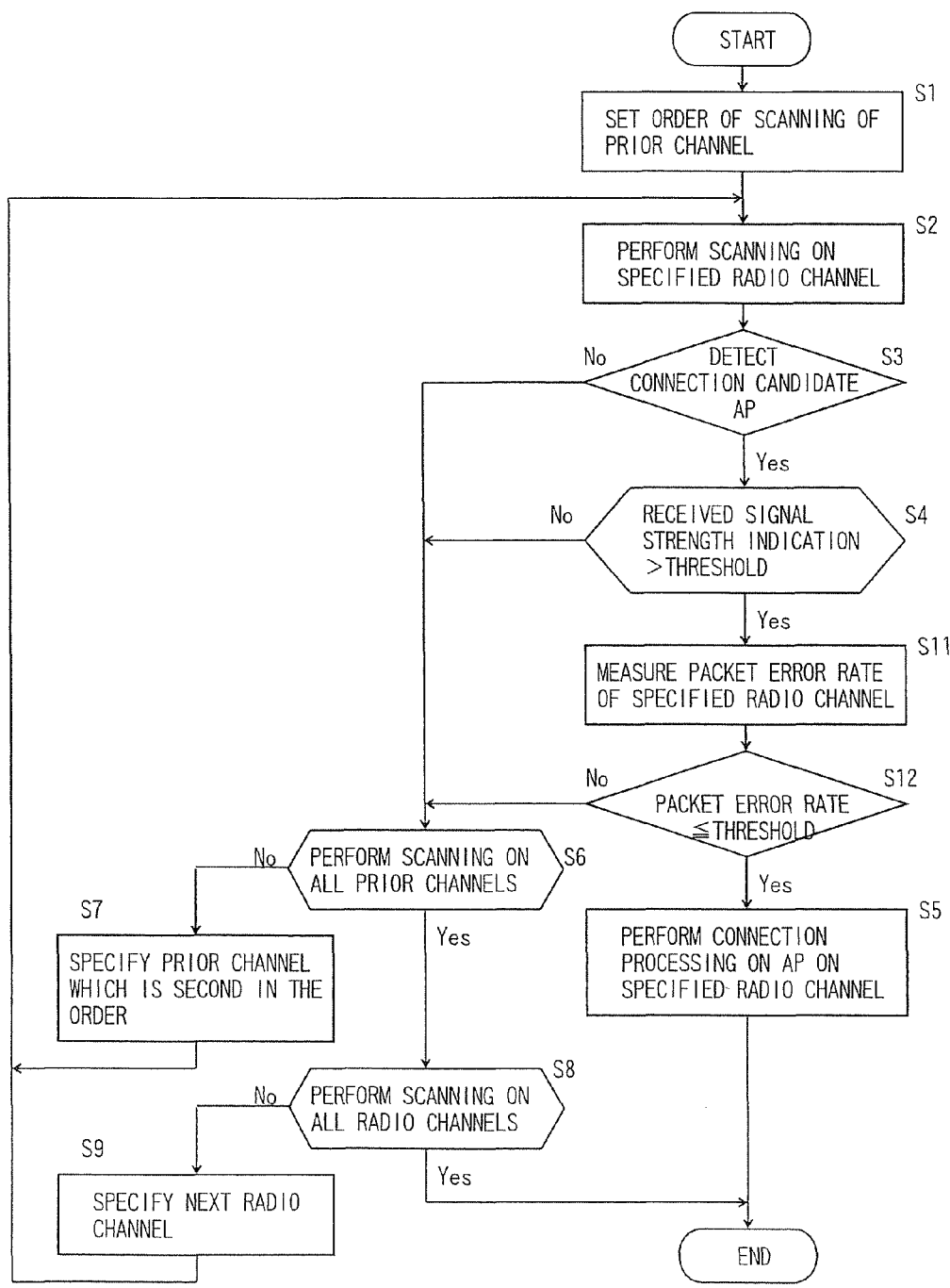
FIG. 3 is a flowchart showing a second embodiment of the AP scan method of the present invention.

FIG. 3 shows a second embodiment of the AP scan method of the present invention.

Figure 4:
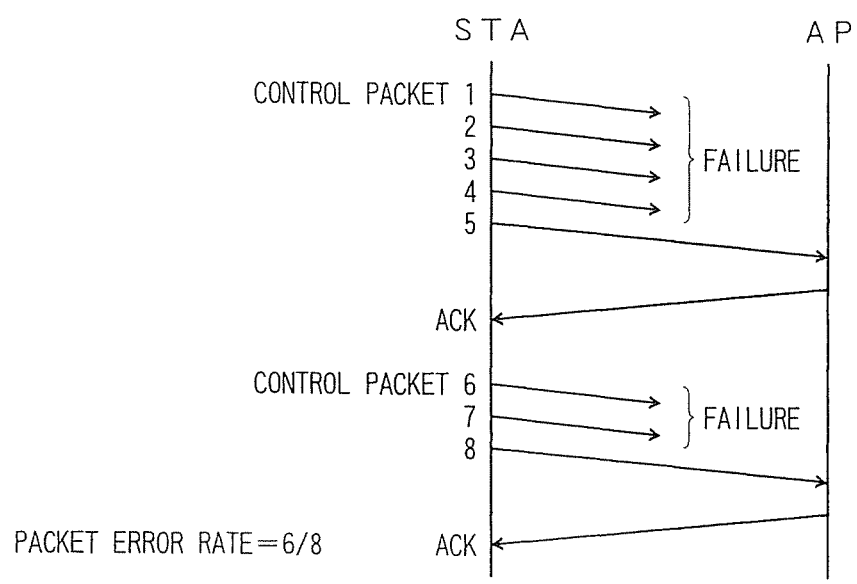
FIG. 4 is a diagram showing an example of measurement of a packet error rate.

A feature of this embodiment is that, in the procedure of the first embodiment shown in FIG. 2, before step S5, a dummy packet is transmitted to the AP selected in step S4 over the radio channel subjected to the scanning, and a packet error rate is measured from the number of received acknowledgement frames relative to the number of transmitted dummy packets (S11). An example of measurement of a packet error rate is shown in FIG. 4. Here, the example shows a case in which control packets 1 to 8 are transmitted, and, for these packets, an ACK packet is received two times, and a packet error rate of 0.75 is obtained by calculation. Next, when the packet error rate measured on the radio channel subjected to the scanning is equal to or less than a predetermined threshold, the procedure proceeds to step S5; when the packet error rate exceeds the predetermined threshold, the procedure proceeds to step S6 (S12).

In general, even when the received signal strength indication on the radio channel subjected to the scanning is high, adequate communication quality cannot be ensured when noise caused by other wireless systems or electronic devices using the same radio channel is high. In this embodiment, good communication quality can be ensured by actually measuring a packet error rate on the radio channel subjected to the scanning and performing connection processing when the packet error rate is equal to or less than a predetermined threshold.

Third Embodiment of the AP Scan Method

Figure 5:
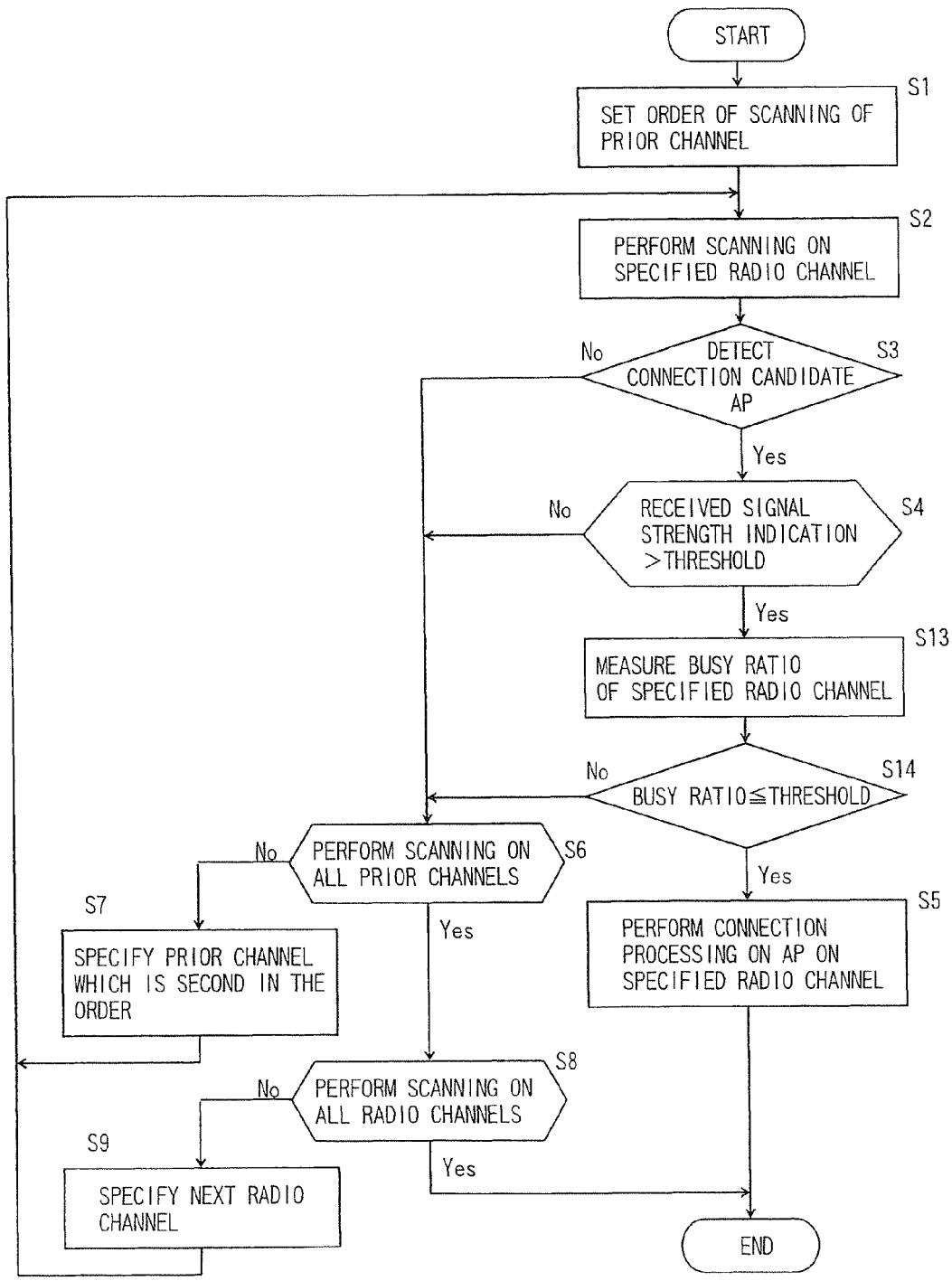
FIG. 5 is a flowchart showing a third embodiment of the AP scan method of the present invention.

FIG. 5 shows a third embodiment of the AP scan method of the present invention.

A feature of this embodiment is that, in the procedure of the first embodiment shown in FIG. 2, before step S5, carrier sense is performed for a predetermined time on the radio channel subjected to the scanning, and a busy ratio indicating a time ratio in which the radio channel is busy is measured (S13). Incidentally, the busy ratio is the time ratio between the busy time (in which the radio channel is being used) and the idle time (in which the radio channel is not being used). Next, when the busy ratio measured on the radio channel subjected to the scanning is equal to or less than a predetermined threshold, the procedure proceeds to step S5; when the busy ratio exceeds the predetermined threshold, the procedure proceeds to step S6 (S14).

In general, even when the received signal strength indication on the radio channel subjected to the scanning is high, adequate communication quality cannot be ensured when the busy ratio of the radio channel is high. In this embodiment, good communication quality can be ensured by actually measuring the busy ratio on the radio channel subjected to the scanning and performing connection processing when the busy ratio is equal to or less than a predetermined threshold.

Fourth Embodiment of the AP Scan Method

Figure 6:
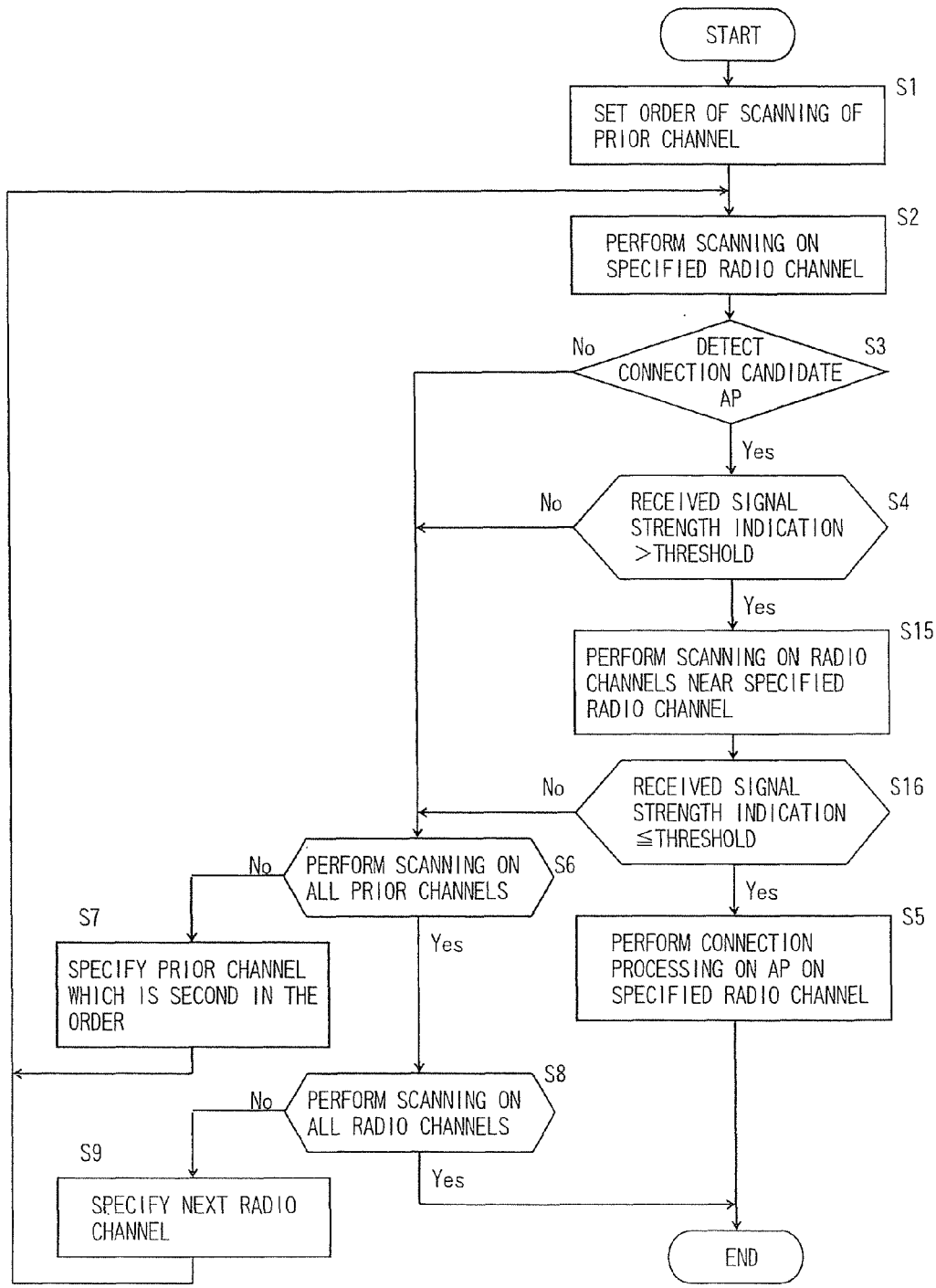
FIG. 6 is a flowchart showing a fourth embodiment of the AP scan method of the present invention.

FIG. 6 shows a fourth embodiment of the AP scan method of the present invention.

A feature of this embodiment is that, in the procedure of the first embodiment shown in FIG. 2, before step S5, scanning is performed on radio channels (one or two channels before and after the radio channel) near the radio channel subjected to the scanning (S15). Next, the received signal strength indication corresponding to the access point which has transmitted a response is detected, and, when the received signal strength indication is equal to or less than a predetermined threshold, the procedure proceeds to step S5; when the received signal strength indication exceeds the predetermined threshold, the procedure proceeds to step S6 (S16).

For example, in a 2.4 GHz wireless LAN, radio waves reach the near channel and a channel next to the near channel, making it impossible to ensure adequate communication quality in an environment in which the near channel is used even when the received signal strength indication on the radio channel subjected to the scanning is high. In this embodiment, scanning is performed on a radio channel near the radio channel subjected to the scanning, and, when the received signal strength indication on the radio channel near the radio channel subjected to the scanning is equal to or less than a threshold, connection processing is performed, whereby it is possible to ensure good communication quality.

Incidentally, in the second to fourth embodiments described above, the procedures for securing good communication quality when the received signal strength indication corresponding to an AP on a radio channel subjected to scanning exceeds a threshold and the radio channel and the AP are treated as the objects to which connection is made can be used in any combination.

Fifth Embodiment of the AP Scan Method

Figure 7:
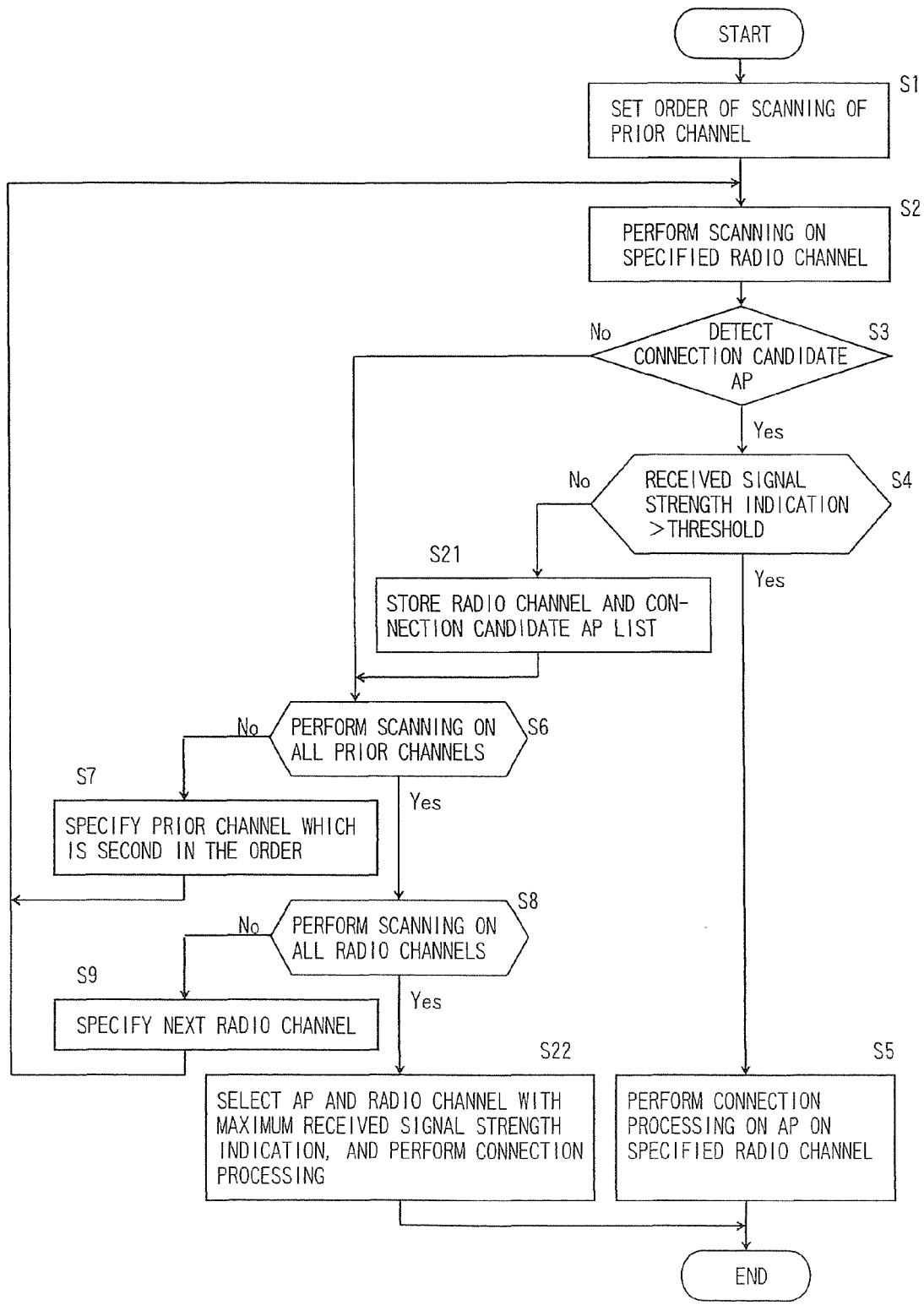
FIG. 7 is a flowchart showing a fifth embodiment of the AP scan method of the present invention.

FIG. 7 shows a fifth embodiment of the AP scan method of the present invention. This embodiment is applied to the first embodiment shown in FIG. 2, and is also applicable to the second to fourth embodiments in a similar manner.

A feature of this embodiment is that, when the connection candidate AP list includes no received signal strength indication exceeds the threshold in step S4, the procedure proceeds to step S6 after the radio channel subjected to the scanning and the connection candidate AP list are stored (S21). Moreover, when a radio channel in which received signal strength indication exceeds the threshold is not found after scanning performed on all the prior channels and all the radio channels is completed in steps S6 and S8, an AP and a radio channel with a maximum received signal strength indication are selected from the received signal strength indications of the connection candidate AP list stored in step S21, and processing for connection with the AP is performed on the radio channel (S22).

Incidentally, for the radio channels which do not meet the conditions of the second to fourth embodiments, when a radio channel meeting the conditions is not found after scanning performed on all the prior channels and all the radio channels is completed in steps S6 and S8, the next best AP and radio channel may be selected, and processing for connection with the access point on the radio channel may be performed in a similar manner.

Sixth Embodiment of the AP Scan Method

Figure 8:
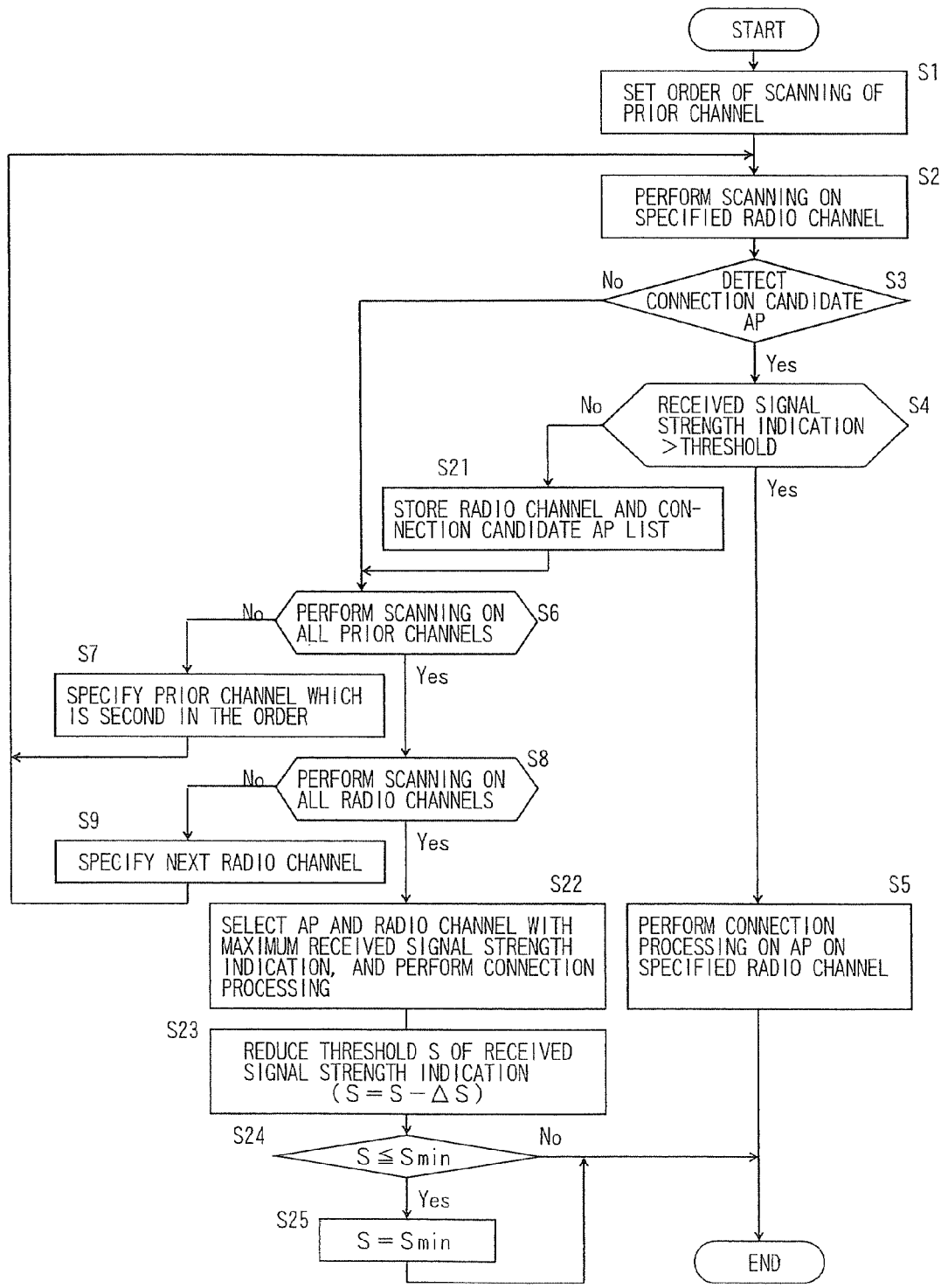
FIG. 8 is a flowchart showing a sixth embodiment of the AP scan method of the present invention.

FIG. 8 shows a sixth embodiment of the AP scan method of the present invention. This embodiment is applied to the first embodiment shown in FIG. 2 and the fifth embodiment shown in FIG. 7.

When the received signal strength indication conditions in the first embodiment are not met, and a radio channel meeting the conditions is not found after scanning performed on all the prior channels and all the radio channels is completed in steps S6 and S8, if the method of the fifth embodiment is adopted for this scanning, it is possible to find a radio channel and an AP on which connection processing is performed. However, there is a possibility that the same is repeated in the next scanning.

In this embodiment, after step S22, processing for reducing a threshold S of a received signal strength indication used in the next scanning in step S4 in such a way that the threshold S does not fall below a predetermined minimum threshold Smin is performed (S23, S24, and S25). This makes it easy to identify a radio channel and an AP which meet the received signal strength indication conditions, the radio channel and the AP on which connection processing is performed, in the next scanning, making it possible to realize efficient active scanning. Incidentally, it is desirable to reset the threshold of the received signal strength indication to return the threshold to an initial value when the station is not used for a certain period of time.

Seventh Embodiment of the AP Scan Method

A method for setting predetermined prior channels from all the prescribed radio channels as radio channels to be subjected to scanning in step S1 of the embodiments described above will be described.

A first method uses the specifications of IEEE 802.11k, acquires, from the AP which is currently in connection, radio channels which are used by APs neighboring the AP, and sets the radio channels as prior channels in the next scanning.

A second method holds a history of the APs and the radio channels which was in connection in the past, based on the history, estimates radio channels of APs to which connection is made next to the AP which is currently in connection, and sets the radio channels as prior channels in the next scanning. The above past history of AP connection is held in the channel decision section 13 shown in FIG. 1 and is operated.

For example, when there is a history indicating an AP1 and a radio channel #3, an AP5 and a radio channel #11, and an AP2 and a radio channel #7 as the order of connection of the previous day, if connection with the AP1 and the radio channel #3 is currently established, the radio channels #11 and #7 corresponding to the AP5 and the AP2 predicted to establish connection next according to the history of the previous day are set as prior channels.

A third method refers to the connection candidate AP list 12 in step S4, and, when one AP to which connection is made is selected from the APs whose corresponding received signal strength indications exceed a predetermined threshold or there is no AP whose corresponding received signal strength indication exceeds a predetermined threshold, holds a connection candidate AP list of the APs which were not selected. Then, when the received signal strength indication corresponding to the AP to which connection is currently established is reduced, radio channels with higher received signal strength indications are set from the connection candidate AP list thus held as prior channels in the next scanning. The connection candidate AP list of the APs which were not selected is generated by the channel decision section 13 shown in FIG. 1 by acquiring the connection candidate AP list 12 and the AP information selected by the AP selection section 14 and is held therein.

For example, when the received signal strength indication corresponding to the AP on the radio channel to which connection is currently established is reduced and active scanning is performed by handoff, there is a possibility that the station has moved in the direction of the AP which was not selected last time due to a low received signal strength indication. Thus, radio channels with higher received signal strength indications are set as prior channels from the last connection candidate AP list of the APs which were not selected.

The steps forming the AP scan control processing described above can be stored in a ROM or the like in advance as a program and be executed by making a CPU which is a computer read the program.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An access point scan method by which a station, connectable to a plurality of access points, actively scans among a plurality of radio channels for an access point with which to connect, comprising:
   a first step setting an order of scanning the radio channels;
   a second step transmitting a probe request for an access point scan over a specified radio channel according to the order of scanning;
   a third step generating a connection candidate access point (AP) list when a probe response to the probe request is received, the connection candidate AP list including information indicating an access point which transmits the probe response and a received signal strength indication;
   a fourth step referring to the connection candidate AP list and selecting one access point from access points whose corresponding received signal strength indications exceed a predetermined threshold;

a fifth step performing connection processing on one access point selected in the fourth step on the specified radio channel;

a sixth step specifying a radio channel which is second in the order and going back to the second step until scanning performed on all radio channels for which the order of scanning is set in the first step is completed when the probe response is not received in the third step or the connection candidate AP list includes no received signal strength indication which exceeds the threshold in the fourth step;

a tenth step storing the specified radio channel and the connection candidate AP list when the connection candidate AP list includes no received signal strength indication which exceeds the threshold in the fourth step and entering the sixth step; and an eleventh step selecting an access point and a radio channel with a maximum received signal strength indication in received signal strength indications of the connection candidate AP list stored in the tenth step and performing processing for connection with the access point on the radio channel when scanning performed on all the radio channels is completed in the sixth step;

before the fifth step, a seventh step transmitting a dummy packet to the access point selected in the fourth step over the specified radio channel, calculating a packet error rate from number of received acknowledgement frames relative to number of transmitted dummy packets, proceeding to the fifth step when the packet error rate is equal to or less than a predetermined threshold, and proceeding to the sixth step when the packet error rate exceeds the predetermined threshold.

2. The access point scan method according to claim 1, comprising after the eleventh step, a twelfth step performing processing for reducing the threshold of the received signal strength indication used in a next scanning in the fourth step in such a way that the threshold does not fall below a predetermined minimum threshold.

3. The access point scan method according to any one of claims 1 and 2, wherein the first step sets predetermined prior channels as radio channels to be subjected to scanning in advance and sets an order of scanning for the prior channels, and the sixth step specifies a radio channel to be subjected to scanning next according to the order of scanning the prior channels, and, when scanning performed on all prior channels is completed, specifies a radio channel to be subjected to scanning next from non-prior channels.

4. The access point scan method according to claim 3, wherein radio channels to be used by a neighboring access point of an access point which is currently in connection are acquired from the access point which is currently in connection, and the radio channels are set as prior channels in the first step in a next scanning.

5. The access point scan method according to claim 3, wherein a history of access points and radio channels being connected in the past is held, radio channels of an access point to which connection is made next to an access point which is currently in connection are estimated based on the history, and the radio channels are set as prior channels in the first step in a next scanning.

6. The access point scan method according to claim 3, wherein a connection candidate AP list of access points not selected is held when one access point to which connection is made is selected in the fourth step from the access points whose corresponding received signal strength indications exceed the predetermined threshold or no access point whose corresponding received signal strength indication exceeds the predetermined threshold exists, and radio channels with higher received signal strength indications are set from the connection candidate AP list being held as prior channels in the first step in a next scanning when a received signal strength indication corresponding to an access point to which connection is currently established is reduced.

7. An access point scan apparatus comprising a processor by which a station, connectable to a plurality of access points, actively scans among a plurality of radio channels for an access point with which to connect, comprising:

a channel decision section setting an order of scanning the radio channels;

a radio connection processing section performing scanning on a specified radio channel according to the order of scanning and generating a connection candidate access point (AP) list including information indicating an access point which responds to the scanning and a received signal strength indication; and an access point (AP) selection section referring to the connection candidate AP list, selecting one access point from access points whose corresponding received signal strength indications exceed a predetermined threshold, and instructing the radio connection processing section to perform connection processing on the one access point on the specified radio channel, and, instructing to perform scanning on a next specified radio channel when no response is made to the scanning or the connection candidate AP list includes no received signal strength indication which exceeds the threshold;

wherein the AP selection section stores the radio channels and the connection candidate AP list when the connection candidate AP list includes no received signal strength indication which exceeds the threshold, and the AP selection section selects an access point and a radio channel with a maximum received signal strength indication in received signal strength indications of the connection candidate AP list and instructs the radio connection processing section to perform connection processing on the access point being selected on the radio channel being selected when scanning performed on all radio channels is completed;

wherein the access point scan apparatus further comprising:

before proceeding to said instructing the radio connection processing section to perform connection processing on the one access point on the specified radio channel, transmitting a dummy packet to the access point selected in the fourth step over the specified radio channel, calculating a packet error rate from number of received acknowledgement frames relative to number of transmitted dummy packets, proceeding to the radio connection processing section to perform connection processing on the one access point on the specified radio channel when the packet error rate is equal to or less than a predetermined threshold, and proceeding to said instructing to perform scanning on the next specified radio channel which is second in the order when the packet error rate exceeds the predetermined threshold.

8. The access point scan apparatus according to claim 7, wherein
the AP selection section performs processing for reducing the threshold of the received signal strength indication used in a next scanning in such a way that the threshold does not fall below a predetermined minimum threshold.

9. The access point scan apparatus according to claim 7, wherein
the channel decision section sets predetermined prior channels as radio channels to be subjected to scanning in advance, sets an order of scanning for the prior channels, and, when scanning performed on all prior channels is completed, specifies a radio channel to be subjected to scanning next from non-prior channels.

10. A non-transitory computer readable storage medium storing an access point scan program which allows a station connectable to a plurality of access points to actively scan among a plurality of radio channels for an access point with which to connect, the program causes a computer to execute steps comprising:
a step setting an order of scanning the radio channels; a step performing scanning on a specified radio channel according to the order of scanning and generating a connection candidate access point (AP) list including information indicating an access point which responds to the scanning and a received signal strength indication;
a step referring to the connection candidate AP list, selecting one access point from access points whose corresponding received signal strength indications exceed a predetermined threshold, and instructing connection processing to be performed on the one access point on the specified radio channel, and, instructing to perform scanning on a next specified radio channel when no response is made to the scanning or the connection candidate AP list includes no received signal strength indication which exceeds the threshold;
a step storing the specified radio channel and the connection candidate AP list when the connection candidate AP list includes no received signal strength indication which exceeds the threshold in the referring step and entering the referring step; and
a step selecting an access point and a radio channel with a maximum received signal strength indication in received signal strength indications of the connection candidate AP list stored in the storing step and performing processing for connection with the access point on the radio channel when scanning performed on all the radio channels is completed in the referring step;
wherein the access point scan program further comprising:
before proceeding to said instructing the radio connection processing to be performed on the one access point on the specified radio channel in the step referring, transmitting a dummy packet to the access point selected in the fourth step over the specified radio channel, calculating a packet error rate from number of received acknowledgement frames relative to number of transmitted dummy packets, proceeding to the radio connection processing to be performed on the one access point on the specified radio channel when the packet error rate is equal to or less than a predetermined threshold, and proceeding to said instructing to perform scanning on the next specified radio channel which is second in the order when the packet error rate exceeds the predetermined threshold.

11. The non-transitory computer readable storage medium according to claim 10, comprising:
after the selecting step, a step performing processing for reducing the threshold of the received signal strength indication used in a next scanning in the referring step in such a way that the threshold does not fall below a predetermined minimum threshold.

* * * * *